United States Patent
Yang

(10) Patent No.: US 9,535,463 B2
(45) Date of Patent: Jan. 3, 2017

(54) CIRCUIT BOARD ASSEMBLING STRUCTURE, ELECTRONIC DEVICE HAVING THE SAME AND ASSEMBLING METHOD OF ELECTRONIC DEVICE

(71) Applicant: GETAC TECHNOLOGY CORPORATION, Hsinchu County (TW)

(72) Inventor: Jui-Lin Yang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 78 days.

(21) Appl. No.: 14/180,282

(22) Filed: Feb. 13, 2014

(65) Prior Publication Data

US 2015/0103475 A1 Apr. 16, 2015

Related U.S. Application Data

(60) Provisional application No. 61/890,792, filed on Oct. 14, 2013.

(51) Int. Cl.
*H05K 7/02* (2006.01)
*G06F 1/16* (2006.01)

(52) U.S. Cl.
CPC ........ *G06F 1/1658* (2013.01); *Y10T 29/49002* (2015.01)

(58) Field of Classification Search
CPC .................................................... G06F 1/1658
USPC .................. 361/679.02, 816–811; 455/575.1
See application file for complete search history.

(56) References Cited

U.S. PATENT DOCUMENTS

| | | | | |
|---|---|---|---|---|
| 5,252,782 A | * | 10/1993 | Cantrell | H05K 9/0033 174/387 |
| 6,972,721 B2 | * | 12/2005 | Park | H01Q 21/28 343/702 |
| 7,911,399 B2 | * | 3/2011 | Yang | H01Q 1/1207 343/702 |
| 2010/0331050 A1 | * | 12/2010 | Tahk | H01Q 1/243 455/566 |
| 2012/0306704 A1 | * | 12/2012 | Li | H01Q 1/243 343/702 |

FOREIGN PATENT DOCUMENTS

TW  201230929 A1  7/2012

* cited by examiner

*Primary Examiner* — Tuan T Dinh
*Assistant Examiner* — Rockshana Chowdhury

(57) ABSTRACT

A circuit board assembling structure includes a first casing, a second casing, a dam and a circuit board. The first casing has an outer edge and at least a snap-engaging element. The second casing is coupled to the first casing. The dam is mounted on the first casing. The at least a snap-engaging element is disposed between the outer edge of the first casing and the dam. The circuit board is a resilient carrier which is snap-engaged with the at least a snap-engaging element, such that the circuit board is disposed between the outer edge of the first casing and the dam. Furthermore, an electronic device having the circuit board assembling structure and an assembling method of the electronic device are further provided.

19 Claims, 7 Drawing Sheets

CIRCUIT BOARD ASSEMBLING STRUCTURE, ELECTRONIC DEVICE HAVING THE SAME AND ASSEMBLING METHOD OF ELECTRONIC DEVICE

BACKGROUND OF THE INVENTION

Field of the Invention

The present invention relates to circuit board assembling structures, electronic devices having the same, and electronic device assembling methods, and more particularly, to a circuit board assembling structure, an electronic device having the same, and an electronic device assembling method to effectuate quick positioning.

Description of the Prior Art

To meet the requirements of modern electronic products, namely high speed, high performance, and compactness, great efforts are made by electronic product manufacturers in downsizing electronic parts and components. Furthermore, various portable electronic devices have become the mainstream of electronic products, such as notebook computers, cell phones, and personal digital assistants (PDA). Moreover, due to advancement of wireless communication technology, global position systems (GPS) and digital TV, for example, have to be operated by wireless communication so as to be operated on the portable electronic devices, thereby bringing convenience to people's life. Reception of the wireless communication signals is usually augmented with an antenna.

Technological advancement ushers in an era of modern wireless network transmission. An antenna is indispensable to wireless transmission in terms of reception and transmission. From the perspective of notebook computers which are becoming more popular with consumers, wireless transmission functionality is a must. As notebook computers are getting more compact, antenna assembly space is becoming smaller. In general, antenna assembly is typically carried out either by means of screwing with screws or by means of adhesion with a backing adhesive. However, screw-based screwing adds difficulty to assembly process, not to mention that the screws take up space. Therefore, is it necessary to perform effective integration of an antenna, reduce the required space, enhance ease of assembly, cut manufacturing and assembly costs, and enhance the stability of antenna signal.

SUMMARY OF THE INVENTION

The present invention provides a circuit board assembling structure, an electronic device having the same, and an assembling method of the electronic device to achieve quick positioning and assembly.

The circuit board assembling structure of the present invention comprises a first casing, a second casing, a dam and a circuit board. The first casing has an outer edge and at least a snap-engaging element. The second casing is coupled to the first casing. The dam is mounted on the first casing. At least a snap-engaging element is disposed between the outer edge of the first casing and the dam. The circuit board is a resilient carrier. The circuit board is snap-engaged with the at least a snap-engaging element and disposed between the outer edge of the first casing and the dam.

The electronic device of the present invention comprises a first casing, a display component, a second casing, a dam and a circuit board. The first casing has the outer edge and at least a snap-engaging element. The second casing is coupled to the first casing to position the display component between the first casing and the second casing. The second casing has an opening for exposing a display surface of the display component. The dam is mounted on the first casing. At least a snap-engaging element is disposed between the outer edge of the first casing and the dam. The circuit board is a resilient carrier. The circuit board is snap-engaged with the at least a snap-engaging element and disposed between the outer edge of the first casing and the dam. The dam encloses the display component and thus is disposed between the display component and the circuit board.

In an embodiment of the present invention, the first casing further comprises a plate which is parallel to the second casing. The dam and at least a snap-engaging element stand on the plate. The dam lies across between the plate and the second casing when the first casing and the second casing are coupled together.

In an embodiment of the present invention, the at least a snap-engaging element is provided in the form of a pair of snap-engaging elements. The first casing has the pair of snap-engaging elements. The two opposing ends of the circuit board are snap-engaged with the paired snap-engaging elements, respectively, to allow the circuit board to be mounted along the direction of extension of the dam.

In an embodiment of the present invention, the circuit board assembling structure further comprises a sealed element abutting against the dam. The first casing and the second casing are coupled together, and the space between the first casing and the second casing is defined and divided into an outside and an inside. The outside encloses the inside. The circuit board is disposed at the outside.

In an embodiment of the present invention, the second casing further has at least a stud. The circuit board has at least a first through hole. The first casing further has at least a second through hole. The at least a stud, the at least a first through hole and the at least a second through hole correspond in position to each other. A screw is passed through the at least a first through hole and the at least a second through hole each and then fastened to the at least a stud, such that the first casing, the circuit board, and the second casing are fastened together.

In an embodiment of the present invention, the second casing further has at least a rib for abutting against the circuit board.

In an embodiment of the present invention, the circuit board comprises an antenna structure.

In an embodiment of the present invention, the first casing has at least a conductive region disposed between the dam and the outer edge. A gasket adheres to a ground terminal on the circuit board, such that the ground terminal abuts against at least a conductive region as soon as the circuit board gets snap-engaged with at least a snap-engaging element.

An electronic device assembling method of the present invention comprises the steps of coupling the circuit board to the first casing. The first casing has at least a snap-engaging element whereby the circuit board is mounted on the first casing. The circuit board is a resilient carrier. The electronic device assembling method of the present invention further comprises the step of inverting the first casing, such that the circuit board is disposed below the first casing. The electronic device assembling method of the present invention further comprises the step of coupling the first casing to the second casing.

In an embodiment of the present invention, the first casing has a pair of snap-engaging elements. The electronic device assembling method further comprises the steps of: inserting an end of the circuit board into one of the snap-engaging elements; exerting a force upon the circuit board to bend the circuit board such that another end of the circuit board is inserted into another said snap-engaging element; and stopping application of the aforesaid force, such that the bent circuit board restores its initial shape by its resilience and gets snap-engaged between the paired snap-engaging elements; wherein, when the circuit board is bent, orthogonal projection dimension of the circuit board on the first casing is shorter than orthogonal projection dimension of a distance between the paired snap-engaging elements on the first casing.

In an embodiment of the present invention, the first casing has the dam and the outer edge. The at least a snap-engaging element is disposed between the dam and the outer edge, such that the circuit board gets snap-engaged with at least a snap-engaging element and thus is disposed between the dam and the outer edge. The electronic device assembling method further comprises the step of mounting a sealed element on the second casing, such that the dam abuts against the sealed element as soon as the first casing is coupled to the second casing.

In an embodiment of the present invention, the circuit board has at least a first through hole. The first casing has at least a second through hole. The electronic device assembling method further comprises the step of aligning the at least a first through hole and the at least a second through hole respectively, when the circuit board is snap-engaged with the first casing.

In an embodiment of the present invention, the second casing has at least a stud. The electronic device assembling method further comprises the step of adjusting the first casing and the second casing so as to position the at least a first through hole, the at least a second through hole, and the at least a stud in place and the step of passing a screw through at least a first through hole and at least a second through hole each and then fastening the screws to the at least a stud, such that the first casing, the circuit board, and the second casing are fixed together.

In an embodiment of the present invention, the electronic device assembling method further comprises the step of adhering a gasket to the ground terminal on the circuit board. Hence, the ground terminal abuts against at least a conductive region of the first casing when the circuit board is snap-engaged with at least a snap-engaging element.

In the aforesaid embodiments, a circuit board assembling structure and an electronic device having the circuit board assembling structure are characterized in that: a dam is mounted on a first casing and a snap-engaging element; the snap-engaging element is disposed between the dam and the outer edge, such that a circuit board gets coupled to the first casing by means of the snap-engaging element and is disposed between the outer edge of the first casing and the dam. Moreover, with the circuit board being a resilient carrier, the circuit board can be bent during an assembly process to admit the snap-engaging element such that, under its resilient restoring force, the circuit board gets snap-engaged with the snap-engaging element. Hence, the circuit board assembling structure not only achieves positioning without a screw or a backing adhesive but also effectively saves assembly space. Furthermore, during the assembly process of the electronic device, the circuit board is coupled to the first casing by means of the circuit board assembling structure, and then the first casing is turned upside down to get coupled to a second casing, such that the circuit board cannot be disconnected from the first casing. In doing so, in the aforesaid embodiments, the circuit board assembling structure, the electronic device, and the assembling method enhance assembly efficiency and ease, effectuate quick positioning, and enable uninstallation and installation.

BRIEF DESCRIPTION OF THE DRAWINGS

To render the features and advantages of the present invention distinctive and comprehensible, the present invention is hereunder illustrated with specific embodiments in conjunction with the accompanying drawings, in which.

DETAILED DESCRIPTION OF THE EMBODIMENTS

Figure 1:
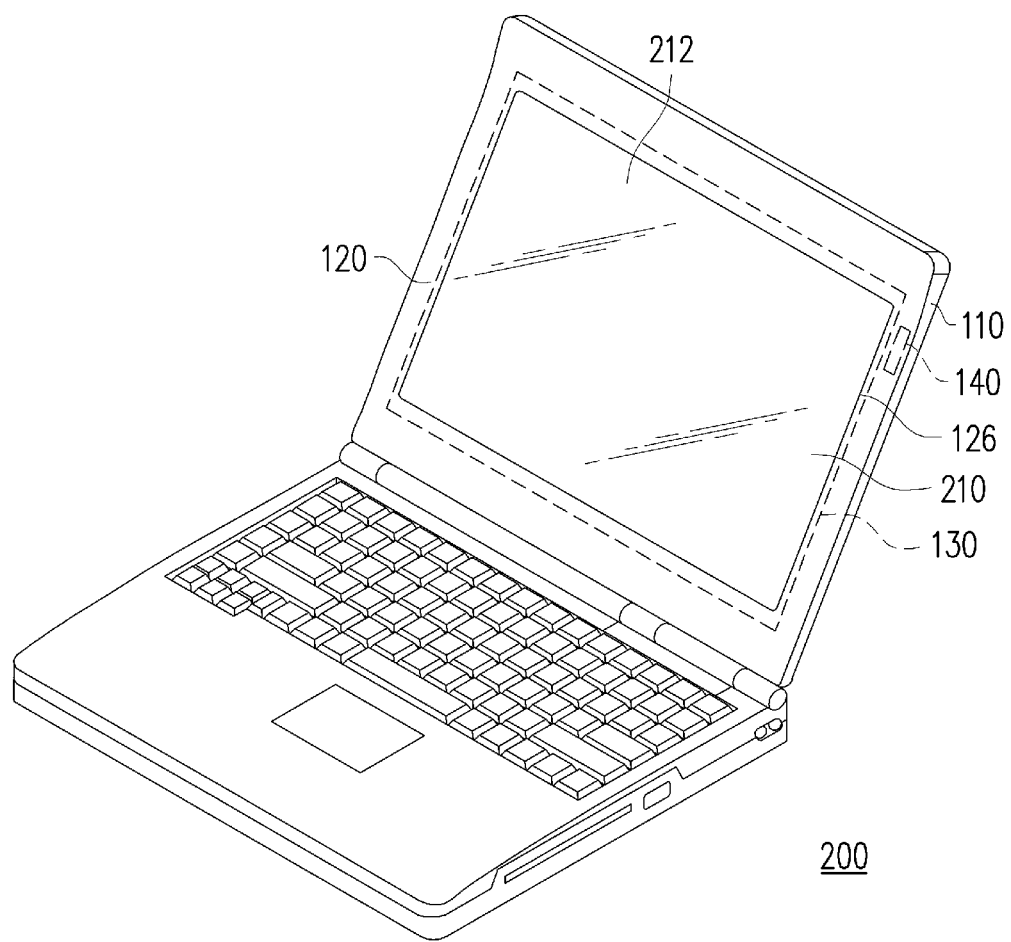
FIG. 1 is a perspective view of an electronic device according to an embodiment of the present invention.
Figure 2:
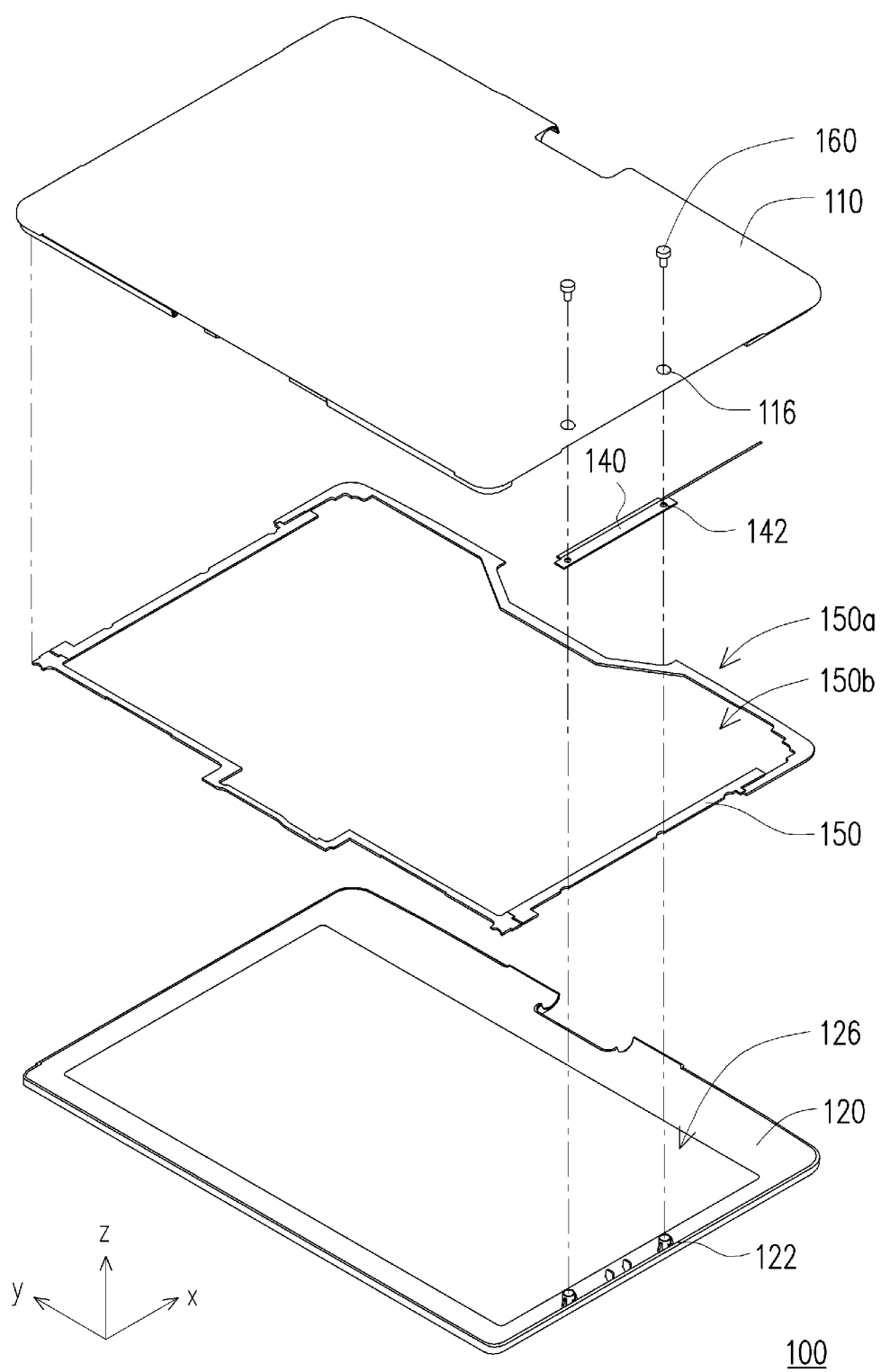
FIG. 2 is an exploded view of a portion of components of the electronic device of FIG. 1.
Figure 3:
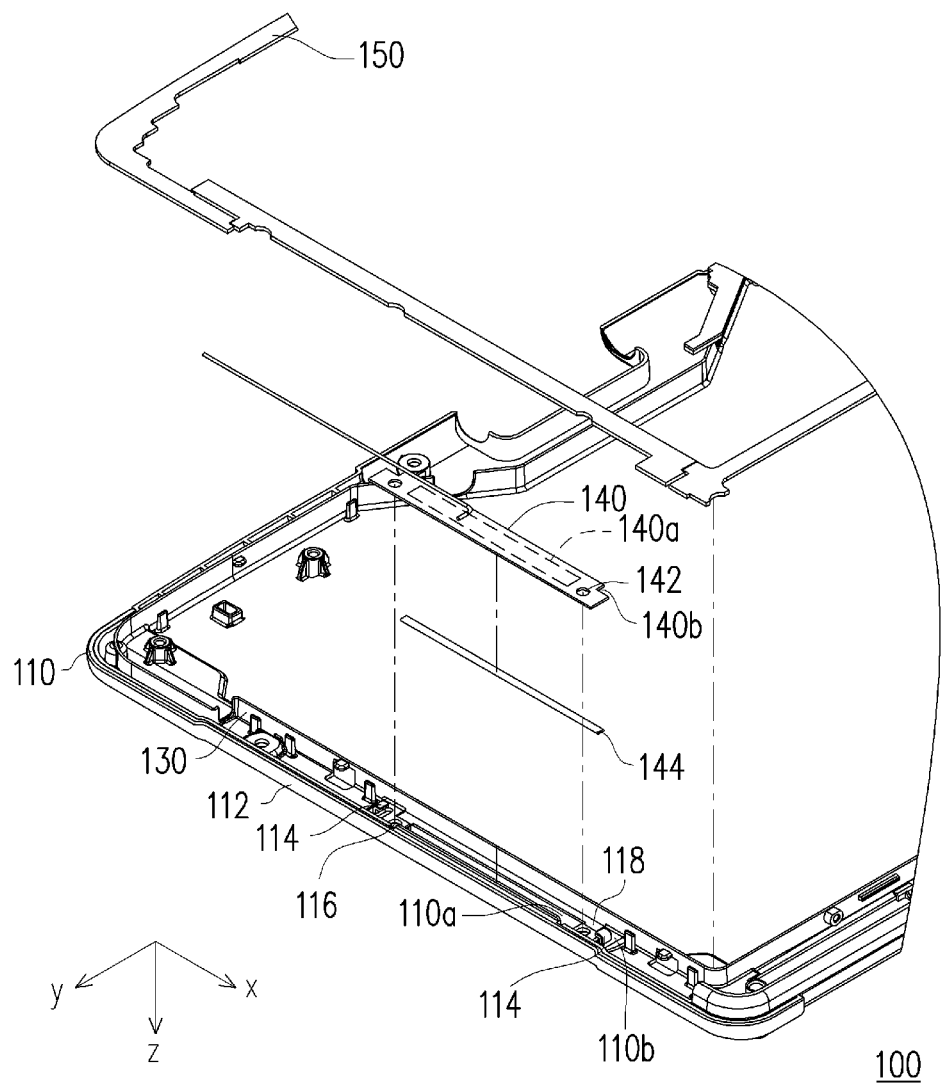
FIG. 3 is a partial enlarged view of a circuit board assembling structure of FIG. 2.

FIG. 1 is a perspective view of an electronic device according to an embodiment of the present invention. FIG. 2 is an exploded view of a portion of components of the electronic device of FIG. 1 to show a circuit board assembling structure 100 for use with an electronic device 200. FIG. 3 is a partial enlarged view of a circuit board assembling structure of FIG. 2, wherein the diagram is drawn to be viewed from an angle opposite to that of FIG. 2 (referring to the coordinate system of FIG. 2 and FIG. 3) so as to clearly identify related features of a first casing 110. Furthermore, an orthogonal coordinate system is provided in related diagrams to depict related features of the present invention.

Referring to FIG. 1 through FIG. 3, in this embodiment, the electronic device 200 is exemplified by a notebook computer and preferably a reinforced rugged computer intended to operate in an adverse environment (at high humidity or dusty space) and thus characterized by specific waterproof and dustproof requirements. However, the present invention is not limited to the above-mentioned, as whatever electronic devices which have the circuit board assembling structure 100 shown in FIG. 2 (including the subsequent diagrams) are applicable to the present invention.

In this embodiment, the circuit board assembling structure 100 is for use with a display screen of a notebook computer. The circuit board assembling structure 100 comprises the first casing 110, a display component 210, a second casing 120, a dam 130 and a circuit board 140. The second casing 120 is coupled to the first casing 110 to position the display component 210 between the first casing 110 and the second casing 120. The second casing 120 has an opening 126 (shown in FIG. 1 and FIG. 2). A display surface 212 of the display component 210 is exposed from the opening 126. The dam 130 is mounted on the first casing 110 and encloses the display component 210. The circuit board 140 comprises an antenna structure 140a. Specifically speaking, a metal antenna structure is mounted on a resilient circuit board 140, such as a printed circuit board (PCB), and electrically connected to a host system of the notebook computer to provide a communication function of the notebook computer.

Again, referring to FIG. 2 and FIG. 3, in this embodiment, the circuit board assembling structure 100 further comprises a pair of snap-engaging elements 114 arranged along the x-axis, mounted on the first casing 110 and disposed between the dam 130 and an outer edge 112 of the first casing 110. Hence, the direction in which the snap-engaging elements 114 are aligned is parallel to the direction of extension of the dam 130 (i.e., the positive and negative x-axis direction.) As mentioned above, since the circuit board 140 is a resilient carrier, the circuit board 140 be bent under a force to generate a resilient restoring force and thus snap-engaged with the snap-engaging elements 114, but the circuit board 140 can be coupled to the first casing 110 to effectuate positioning without a screw or a backing adhesive, and then the first casing 110 is coupled to the second casing 120 to finalize the assembly procedure of the circuit board assembling structure 100. Accordingly, as the circuit board 140 is snap-engaged with the snap-engaging elements 114 without a means of snap-engagement, such as a screw or a backing adhesive, the circuit board assembling structure 100 can effectuate positioning quickly. Therefore, the present invention reduces the required assembly space and enhances the ease of assembly. Furthermore, the circuit board 140 is disposed between the first casing 110 and the second casing 120 and elevated to prevent the antenna structure 140a in the circuit board 140 from getting close enough to the first casing 110 or the second casing 120 to interfere with its signals, thereby enhancing the stability of antenna signal.

Figure 4:
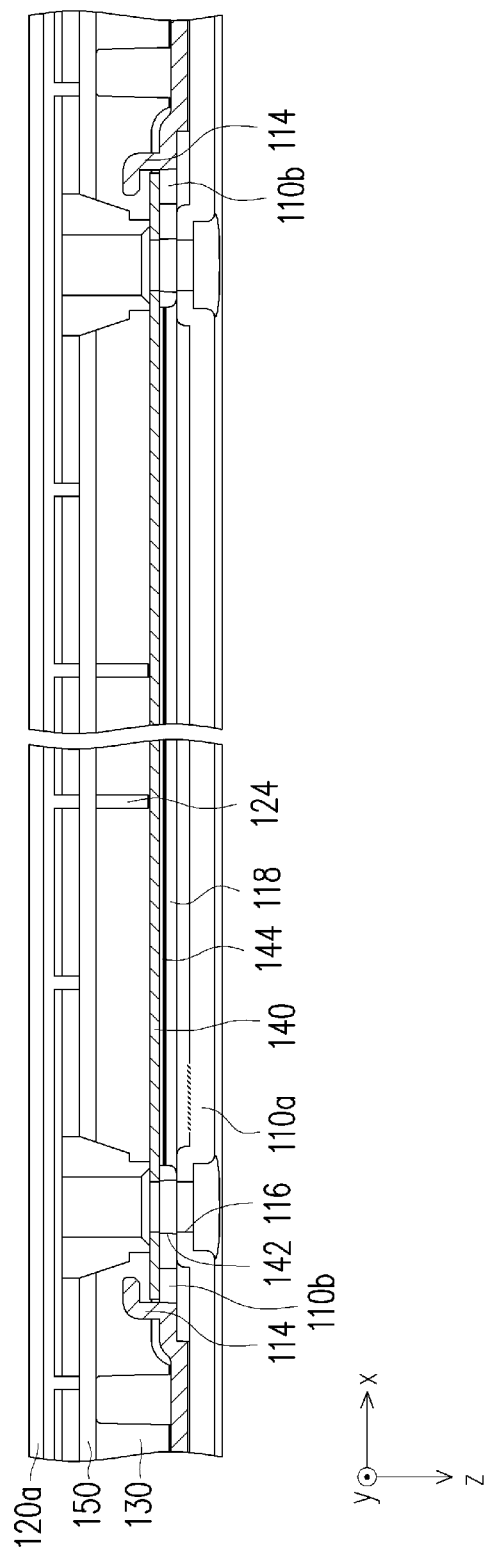
FIG. 4 is a partial cross-sectional view of the circuit board assembling structure shown in FIG. 2 and taken across the x-z plane.
Figure 5:
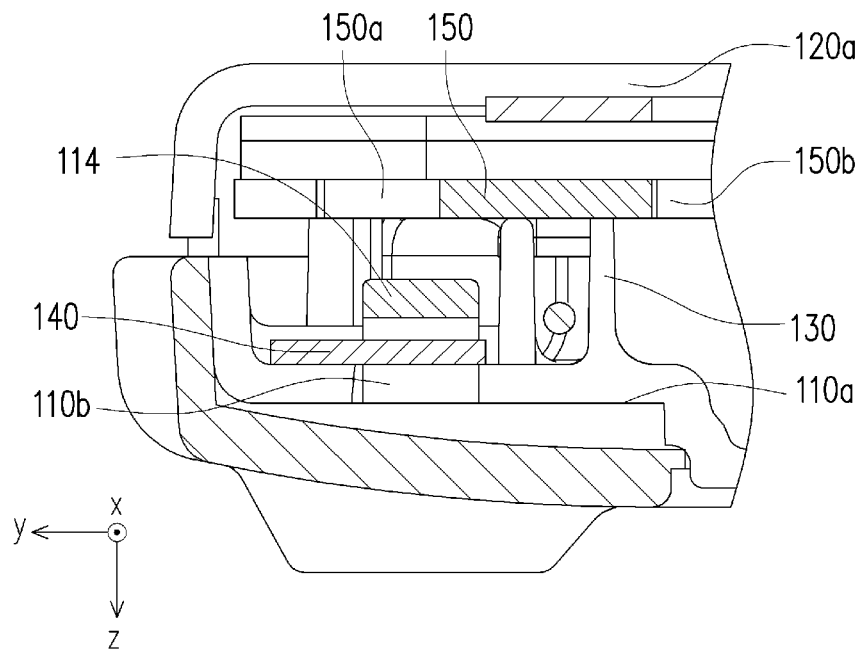
FIG. 5 is a partial cross-sectional view of the circuit board assembling structure shown in FIG. 2 and taken across the y-z plane.

FIG. 4 and FIG. 5 are partial cross-sectional views of the circuit board assembling structure 100 of FIG. 2, wherein FIG. 4 is taken across the x-z plane, whereas FIG. 5 is taken across the y-z plane. Referring to FIG. 3 through FIG. 5, the first casing 110 further comprises a plate 110a, whereas the second casing 120 further comprises a plate 120a, thereby allowing the dam 130 and the snap-engaging elements 114 to stand on the plate 110a and be integrally formed as a unitary structure. As soon as the first casing 110 and the second casing 120 are coupled together, the plates 110a, 120a are disposed in parallel with each other, and the dam 130 lies across between the plates 110a, 120a.

The circuit board assembling structure 100 further has a sealed element 150 which abuts against the dam 130 when the first casing 110 and the second casing 120 are coupled together, such that the space between the first casing 110 and the second casing 120 is defined and divided into an outside 150a and an inside 150b. The outside 150a encloses the inside 150b. The display component 210 is disposed at the inside 150b. The circuit board 140 is disposed at the outside 150b. The sealed element 150 is exemplified by waterproof foam and operates in conjunction with the dam 130 to bring about a waterproof and dustproof effect targeted at the inside 150b, such that the display component 210 and related electronic components at the inside 150b are protected against damage.

The circuit board 140 further comprises a gasket 144 and a ground terminal 140b. The ground terminal 140b may be a metal layer partially exposed from the surface of the circuit board 140. The gasket 144 adheres to the ground terminal 140b and is in contact therewith. The first casing 110 has at least a conductive region 118 which is disposed between the dam 130 and the outer edge 112. As soon as the circuit board 140 is snap-engaged with the snap-engaging elements 114, the ground terminal 140b abuts against the at least a conductive region 118 by means of the gasket 144, and in consequence the ground terminal 140b is in electrical conduction with the at least a conductive region 118, thereby enhancing the grounding of the circuit board 140.

Figure 6:
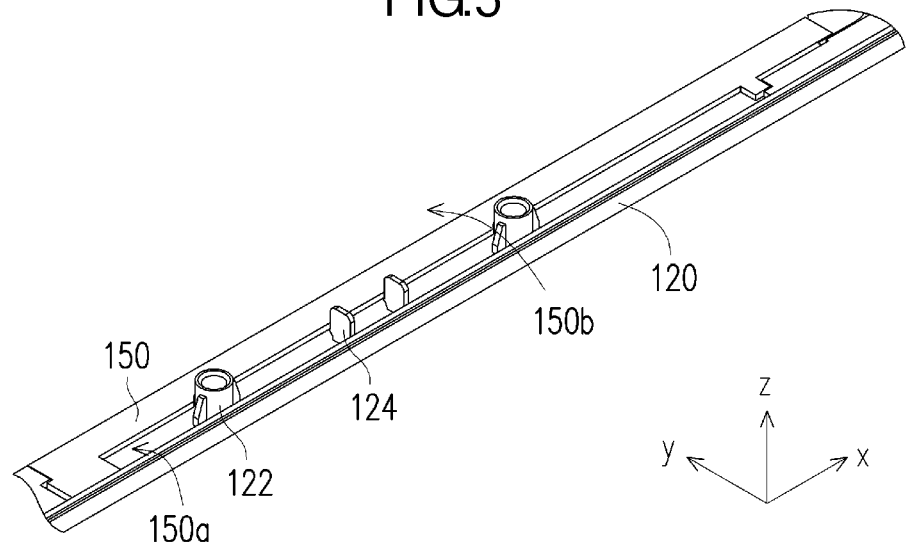
FIG. 6 is a partial enlarged view of a second casing of FIG. 2.

FIG. 6 is a partial enlarged view of the second casing of FIG. 2. Referring to FIG. 4 through FIG. 6, in this embodiment, the second casing 120 further has the at least a rib 124 standing on the plate 120a. As soon as the first casing 110 and the second casing 120 get coupled together, the at least a rib 124 abuts against the circuit board 140 and thus supports the circuit board 140. Hence, not only can the circuit board 140 bear its own weight or external pressure to avoid deformation, but the satisfactory communication functionality of the antenna structure 140a on the circuit board 140 can also be maintained.

When the circuit board 140 is fixed to the first casing 110 by the snap-engaging elements 114, the circuit board 140 is actually underpinned by a carrying protruding portion 110b of the first casing 110 and thus fixed in place by the snap-engaging elements 114. Hence, when mounted, the circuit board 140 is actually spaced apart from the plate 110a of the first casing 110 by a gap. In this embodiment, the second casing 120 further has a stud 122 standing on the plate 120a, the circuit board 140 has a first through hole 142, and the first casing 110 further has a second through hole 116. In this embodiment, the stud 122, the first through hole 142 and the second through hole 116 correspond in position to each other. Moreover, a screw 160 is passed through the first through hole 142 and the second through hole 116 each and then fastened to the stud 122, such that the first casing 110, the circuit board 140, and the second casing 120 are fastened and fixed together. Hence, due to the structural features of the stud 122, the circuit board 140 is also spaced apart from the plate 120a of the second casing 120 by a gap. Therefore, the circuit board 140 can be positioned between the first casing 110 and the second casing 120 without coming into physical contact with the plates 110a, 120a; and the circuit board 140 is spaced apart from the first casing 110 and the second casing 120 by a gap so as to prevent the first casing 110 or the second casing 120 from interfering with the communication functionality of the antenna structure 140a on the circuit board 140 when the first casing 110 or the second casing 120 is made of metal. Hence, the aforesaid assembling structure stabilizes the communication functionality of the antenna structure 140a.

Figure 7:
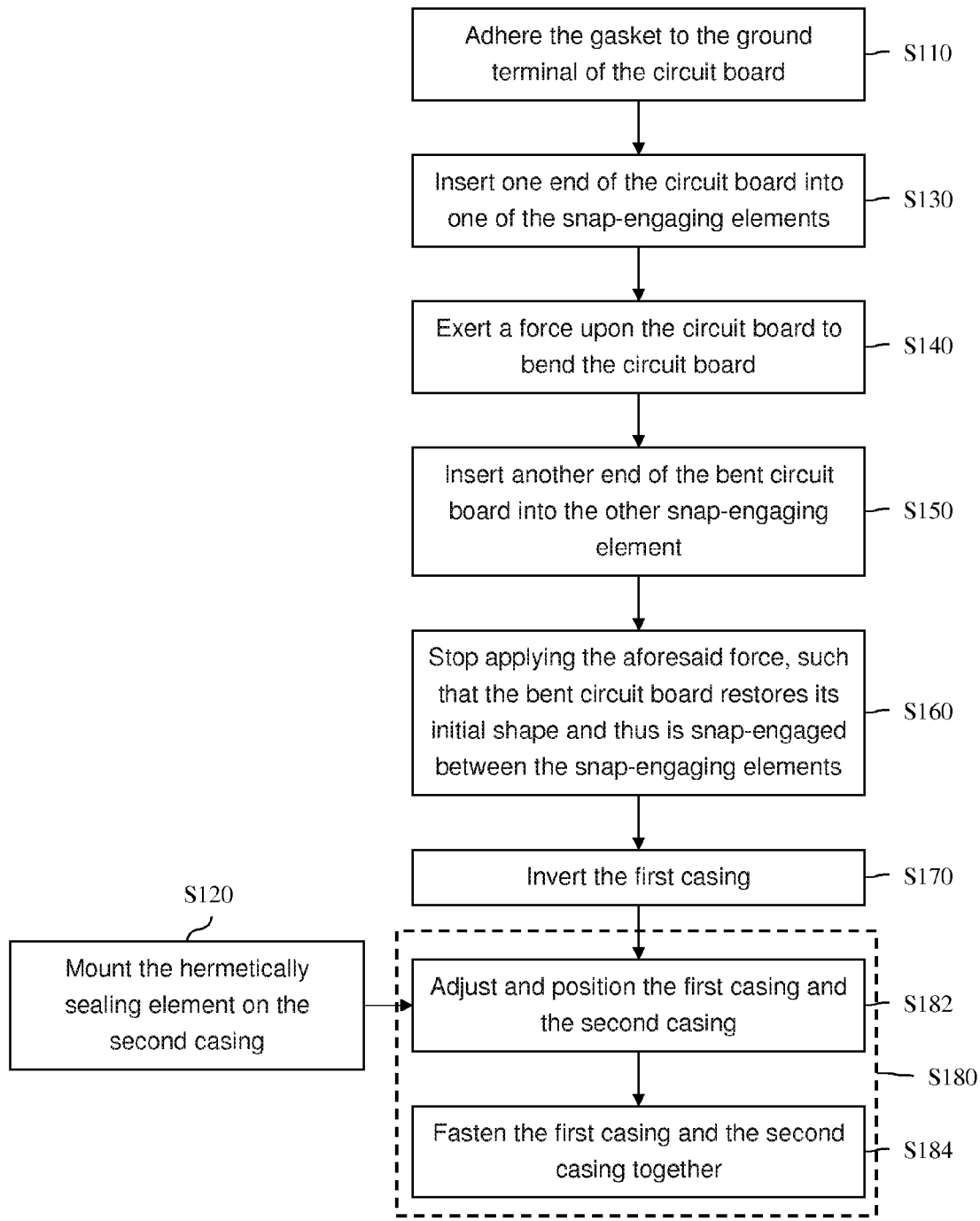
FIG. 7 is a flow chart of an electronic device assembling method according to an embodiment of the present invention.
Figure 8:
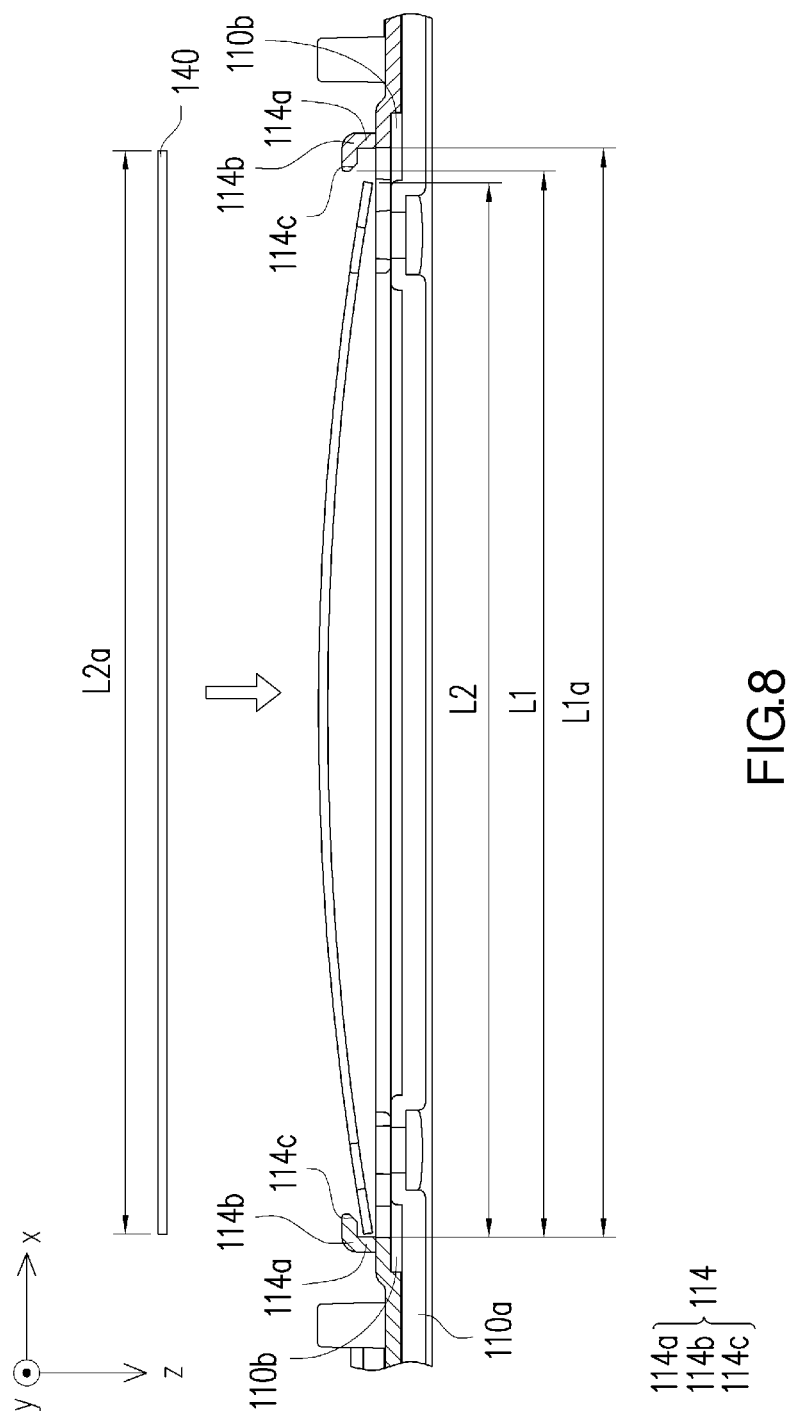
FIG. 8 is a schematic view of assembly of a circuit board and a first casing.

FIG. 7 is a flow chart of an electronic device assembling method according to an embodiment of the present invention. FIG. 8 is a schematic view of the assembly of the circuit board and the first casing. The process flow of the electronic device assembling method according to an embodiment of the present invention is hereunder described with reference to FIG. 2 through FIG. 6, FIG. 7 and FIG. 8. First, in step S110, the electronic device assembling method comprises the step of adhering the gasket 144 to the ground terminal 140b of the circuit board 140. Furthermore, in step S120, the electronic device assembling method comprises the step of mounting the sealed element 150 on the second casing 120.

As indicated above, with the circuit board 140 being a resilient carrier, step S130 entails inserting one end of the circuit board 140 into one of the snap-engaging elements 114, and step S140 entails exerting a force upon the circuit board 140 to bend the circuit board 140 in a manner that orthogonal projection dimension L2 of the circuit board 140 on the first casing 110 (i.e., x-y plane) is shorter than orthogonal projection dimension L1 of a distance between the snap-engaging elements 114 on the first casing 110 (i.e., x-y plane), wherein the snap-engaging elements 114 each comprises a neck portion 114a extending from the plate 110a and an elevated portion 114b extending from the neck portion 114a. The elevated portions 114b of the snap-engaging elements 114 face each other. The distance, to which orthogonal projection dimension L1 is attributed, equals the relative distance between the neck portion 114a of one of the snap-engaging elements 114 and the elevated portion 114b of the other snap-engaging element 114, and related details are described later. Step S150 entails inserting another end of the bent circuit board 140 into the other snap-engaging element 114. In step S160, stop applying the aforesaid force, such that the circuit board 140 restores its initial shape under its resilient restoring force and thus is snap-engaged between the snap-engaging elements 114. Accordingly, the circuit board 140 is snap-engaged between the snap-engaging elements 114 transversely (i.e., along x-axis) and held between the carrying protruding portion 110b and the snap-engaging elements 114 longitudinally (i.e., along z-axis) as shown in FIG. 4 and FIG. 5. At this point in time, the gasket 144 on the circuit board 140 abuts against the at least a conductive region 118 of the first casing 110. Moreover, a lead angle 114c is disposed on one side of each of the snap-engaging elements 114, wherein the one side of each of the snap-engaging elements 114 is positioned proximate to the first casing 110, and the lead angles 114c render it easy for the circuit board 140 to be snap-engaged with the snap-engaging elements 114.

Referring to FIG. 8, specifically speaking, when the circuit board 140 is not bent, its length L2a is substantially equal to or less than relative distance L1a between the neck portions 114a of the snap-engaging elements 114. At this point in time, the first casing 110 is subjected to the influence of the peripheral structure of the snap-engaging elements 114; hence, it is impossible for the circuit board 140 to be inserted laterally (i.e., in the vertical direction shown in FIG. 8) and directly between the snap-engaging elements 114. Hence, the objective of assembly must be achieved by the resilience of the circuit board 140. In other words, when one end of the circuit board 140 is inserted into the neck portion 114a of one of the snap-engaging elements 114 such that the circuit board 140 is bent under an external force applied thereto, the orthogonal projection dimension L2 of the bent circuit board 140 on the first casing 110 (i.e., x-y plane) is shorter than the orthogonal projection dimension L1; that is to say, the orthogonal projection dimension L1 equals the relative distance between the neck portion 114a of one said snap-engaging element 114 and the elevated portion 114b of another said snap-engaging element 114.

Afterward, in step S170, inverting the first casing 110 such that the circuit board 140 is disposed below the first casing 110 (in a manner shown in FIG. 2); at this point in time, the circuit board 140 has been snap-engaged with the snap-engaging elements 114, and in consequence the circuit board 140 is unlikely to be disconnected from the snap-engaging elements 114 even though the first casing 110 is inverted. Therefore, in step S180 (described later), the first casing 110 gets coupled to the second casing 120 in the aforesaid manner, such that the dam 130 abuts against the sealed element 150. In the assembly process of step S180 which consists of step S182 and step S184, step S182 entails adjusting the first casing 110 and the second casing 120 so as to position the first through hole 142, the second through hole 116 and the stud 122 in place, and then step S184 entails passing the screws 160 through the first through hole 142 and the second through hole 116, respectively, and then fastening the screws 160 to the stud 122, such that the first casing 110, the second casing 120, and the circuit board 140 are fixed together; meanwhile, with a screwing force being generated from the screw 160, the dam 130 presses against the sealed element 150 further to thereby achieve a hermetic seal.

In conclusion, a circuit board assembling structure and an electronic device having the circuit board assembling structure according to the present invention are characterized in that: snap-engaging elements of a first casing are disposed between the outer edge of the first casing and a dam, such that a circuit board is fastened to the snap-engaging elements and then disposed between the outer edge of the first casing and the dam. Moreover, with the circuit board being a resilient carrier, the circuit board is bent and thus snap-engaged with the snap-engaging elements to achieve the positioning of the circuit board during the assembly process to thereby dispense with additional fasteners or adhesives, save assembly space and costs, and enhance ease and efficiency of assembly.

Furthermore, during an assembly process of the electronic device, the circuit board gets coupled to the first casing by means of the aforesaid assembling structure, and then the first casing is inverted in order to be coupled to the second casing, thereby preventing the circuit board from being disconnected from the first casing.

Furthermore, the circuit board assembling structure of the present invention is characterized in that: a gap is defined between the first casing 110 and the second casing 120, and at least a rib supports the circuit board. Hence, the circuit board assembling structure of the present invention is effective in reducing the likelihood that the first casing or the second casing will interfere with and affect signals of the circuit board and preventing the deformation of the circuit board. Accordingly, a circuit board assembling structure, an electronic device having the same, and an assembling method of the electronic device according to the embodiments of the present invention are capable of quick positioning, uninstallation, installation, and assembly.

Although the present invention is disclosed above by embodiments, the embodiments are not restrictive of the present invention. Persons skilled in the art can make some changes and modifications to the embodiments without departing from the spirit and scope of the present invention. Therefore, the scope of the present invention must be defined by the appending claims.

What is claimed is:

1. A display panel including a circuit board assembling structure, the circuit board assembling structure comprising:
    a first casing having an outer edge, a plate portion, a protruding portion extending from the plate portion, and at least one snap-engaging element;
    a second casing coupled to the first casing;
    a dam mounted on the first casing, wherein the at least one snap-engaging element and the protruding portion are disposed between the outer edge of the first casing and the dam; and
    a circuit board being a resilient carrier and being snap-engaged with the at least one snap-engaging element and thus disposed between the outer edge of the first casing and the dam;
    wherein the first casing has at least one conductive region disposed between the dam and the outer edge, wherein the at least one conductive region forms a ledge between the outer edge and the dam, and a gasket is adhered to a ground terminal on the circuit board, wherein, when the circuit board is snap-engaged with the at least one snap-engaging element, the gasket abuts against the at least one conductive region, and the circuit board is held between the protruding portion and the at least one snap-engaging element, such that the circuit board is spaced apart from the plate portion by a gap.

2. The display panel of claim 1, wherein the first casing further comprises a plate parallel to the second casing to allow the dam and the at least one snap-engaging element to stand on the plate such that the dam lies across between the plate and the second casing when the first casing and the second casing are coupled together.

3. The display panel of claim 1, wherein the at least one snap-engaging element is provided in form of a pair of snap-engaging elements, and the first casing has the pair of snap-engaging elements, such that two opposing ends of the circuit board are snap-engaged with the paired snap-engaging elements, respectively, to allow the circuit board to be mounted along a direction of extension of the dam.

4. The display panel of claim 1, wherein the board assembling structure further comprises a sealed element abutting against the dam, such that the first casing and the second casing are coupled together, and a space between the first casing and the second casing is defined and divided into an outside and an inside, the inside being enclosed by the outside, and the circuit board being disposed at the outside.

5. The display panel of claim 1, wherein the second casing further has at least one stud, the circuit board has at least one first through hole, and the first casing further has at least one second through hole, wherein the at least one stud, the at least one first through hole and the at least one second through hole correspond in position to each other, wherein a screw is passed through the at least one first through hole and the at least one second through hole each and then fastened to the at least one stud, such that the first casing, the circuit board, and the second casing are fastened together.

6. The display panel of claim 1, wherein the second casing further has at least one rib abutting against the circuit board.

7. The display panel of claim 1, wherein the circuit board comprises an antenna structure.

8. An electronic device including a display panel, the display panel comprising:
   a first casing having an outer edge, a plate portion, a protruding portion extending from the plate portion, and at least one snap-engaging element;
   a display component;
   a second casing coupled to the first casing to position the display component between the first casing and the second casing and having an opening for exposing a display surface of the display component;
   a dam mounted on the first casing, wherein the at least one snap-engaging element and the protruding portion are disposed between the outer edge of the first casing and the dam; and
   a circuit board being a resilient carrier and being snap-engaged with the at least one snap-engaging element and thus disposed between the outer edge of the first casing and the dam, wherein the dam encloses the display component and thus is disposed between the display component and the circuit board;
   wherein the first casing has at least one conductive region disposed between the dam and the outer edge, wherein the at least one conductive region forms a ledge between the outer edge and the dam, and a gasket is adhered to a ground terminal on the circuit board, wherein, when the circuit board is snap-engaged with the at least one snap-engaging element, the gasket abuts against the at least one conductive region, and the circuit board is held between the protruding portion and the at least one snap-engaging element, such that the circuit board is spaced apart from the plate portion by a gap.

9. The electronic device of claim 8, wherein the first casing further comprises a plate parallel to the second casing to allow the dam and the at least one snap-engaging element to stand on the plate such that the dam lies across between the plate and the second casing when the first casing and the second casing are coupled together.

10. The electronic device of claim 8, wherein the at least one snap-engaging element is provided in form of a pair of snap-engaging elements, and the first casing has the pair of snap-engaging elements, such that two opposing ends of the circuit board are snap-engaged with the paired snap-engaging elements, respectively, to allow the circuit board to be mounted along a direction of extension of the dam.

11. The electronic device of claim 8, wherein the display panel further comprises a sealed element abutting against the dam such that a space between the first casing and the second casing is defined and divided into an outside and an inside when the first casing and the second casing are coupled together, the inside being enclosed by the outside, the circuit board being disposed at the outside, and the display component being disposed at the inside.

12. The electronic device of claim 8, wherein the second casing further has at least one stud, the circuit board has at least one first through hole, and the first casing further has at least one second through hole, wherein the at least one stud, the at least one first through hole and the at least one second through hole correspond in position to each other, wherein a screw is passed through the at least one first through hole and the at least one second through hole each and then fastened to the at least one stud, such that the first casing, the circuit board, and the second casing are fastened together.

13. The electronic device of claim 8, wherein the second casing further has at least one rib for abutting against the circuit board.

14. An electronic device assembling method for assembling the electronic device of claim 8, the method comprising the steps of:
   coupling the circuit board to the first casing by means of the at least one snap-engaging element such that the circuit board is mounted on the first casing;
   inverting the first casing, such that the circuit board is disposed below the first casing; and
   coupling the first casing to a second casing.

15. The electronic device assembling method of claim 14, wherein the first casing has at least a pair of snap-engaging elements, the electronic device assembling method further comprising the steps of:
   inserting an end of the circuit board into one of the snap-engaging elements;
   exerting a force upon the circuit board to bend the circuit board such that another end of the circuit board is inserted into another said snap-engaging element, wherein, when the circuit board is bent, orthogonal projection dimension of the circuit board on the first casing is shorter than orthogonal projection dimension of a distance between the paired snap-engaging elements on the first casing; and
   stopping application of the aforesaid force, such that the bent circuit board restores its initial shape by its resilience and snap-engages with the pair of snap-engaging elements.

16. The electronic device assembling method of claim 14, further comprising the step of:
   mounting a sealed element on the second casing to allow the dam to abut against the sealed element when the first casing is coupled to the second casing.

17. The electronic device assembling method of claim 14, wherein the circuit board has at least one first through hole, and the first casing has at least one second through hole, the electronic device assembling method further comprising the step of:
   aligning the at least one first through hole at the at least one second through hole respectively, when the circuit board is snap-engaged with the first casing.

18. The electronic device assembling method of claim 17, wherein the second casing has at least one stud, the electronic device assembling method further comprising the steps of:
   adjusting the first casing and the second casing so as to position the at least one first through hole, the at least one second through hole and the one stud in place; and
   passing a screw through the at least one first through hole and the at least one second through hole each and then fastening the screws to the at least a stud, such that the first casing, the circuit board, and the second casing are fixed together.

19. The electronic device assembling method of claim 14, further comprising the step of:
   adhering the gasket to the ground terminal on the circuit board, such that the ground terminal abuts against the at least one conductive region of the first casing when the circuit board is snap-engaged with the at least one snap-engaging element.

\* \* \* \* \*